Feb. 28, 1939.  H. C. BURDEN  2,148,433
APPARATUS FOR COUNTERSINKING OPERATIONS AND THE LIKE
Original Filed July 11, 1932  6 Sheets-Sheet 1
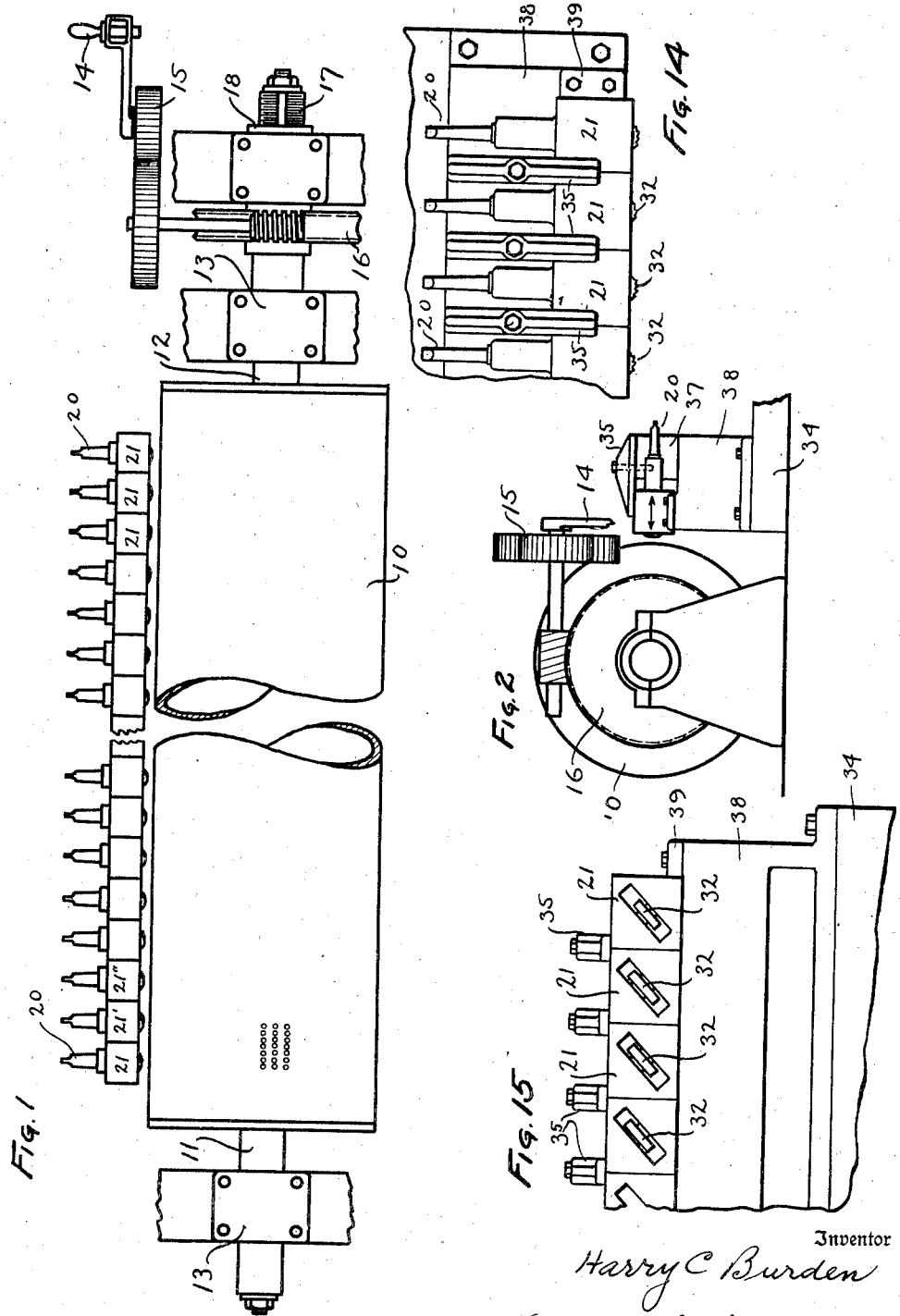
Inventor
Harry C Burden
Maréchal & Noz
Attorney

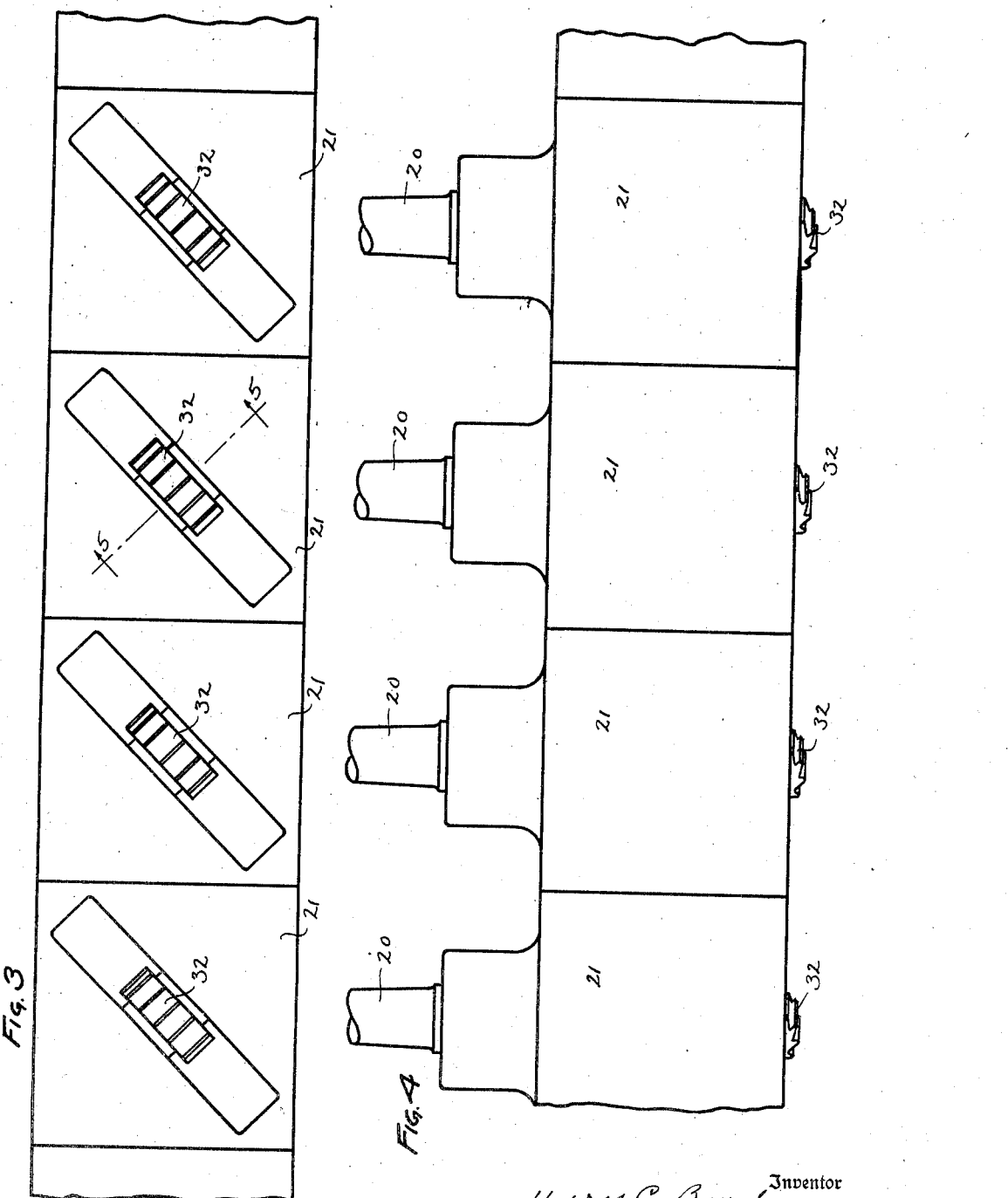

Feb. 28, 1939.   H. C. BURDEN   2,148,433
APPARATUS FOR COUNTERSINKING OPERATIONS AND THE LIKE
Original Filed July 11, 1932   6 Sheets-Sheet 3
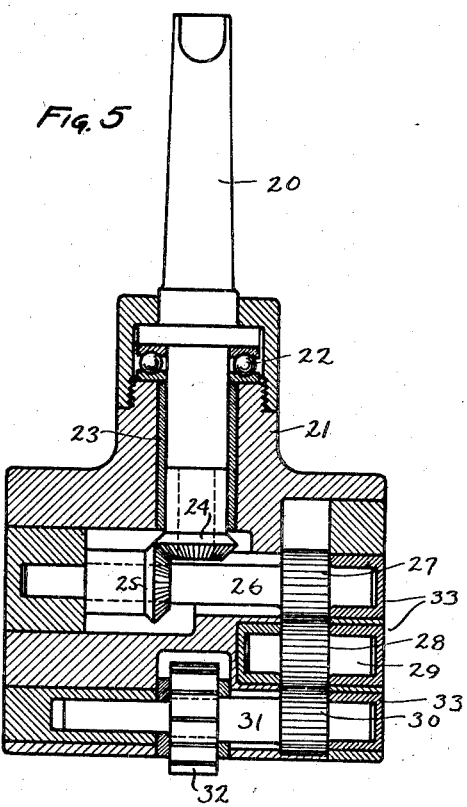
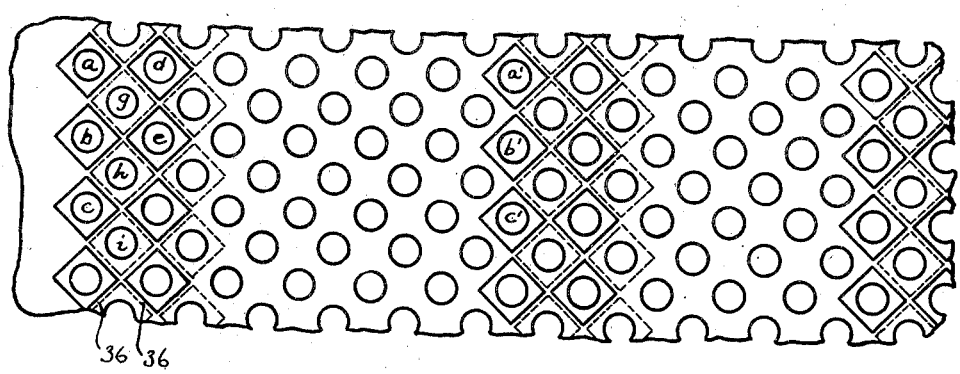
Inventor
Harry C Burden
Maréchal & Noe
Attorney

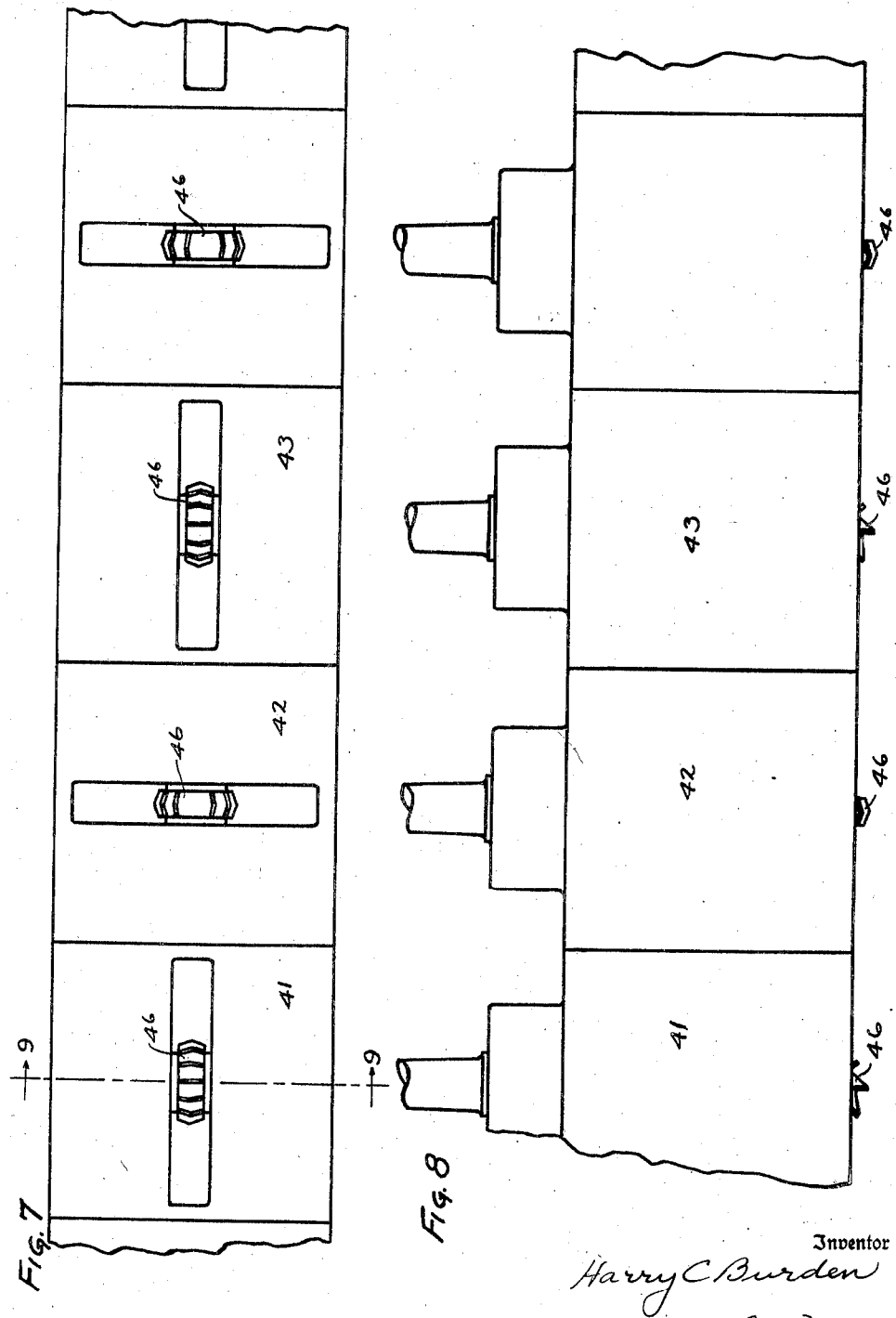

Feb. 28, 1939. H. C. BURDEN 2,148,433
APPARATUS FOR COUNTERSINKING OPERATIONS AND THE LIKE
Original Filed July 11, 1932   6 Sheets-Sheet 5
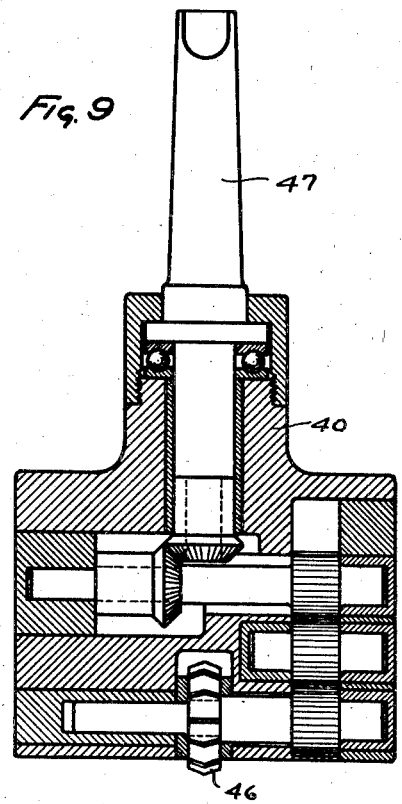
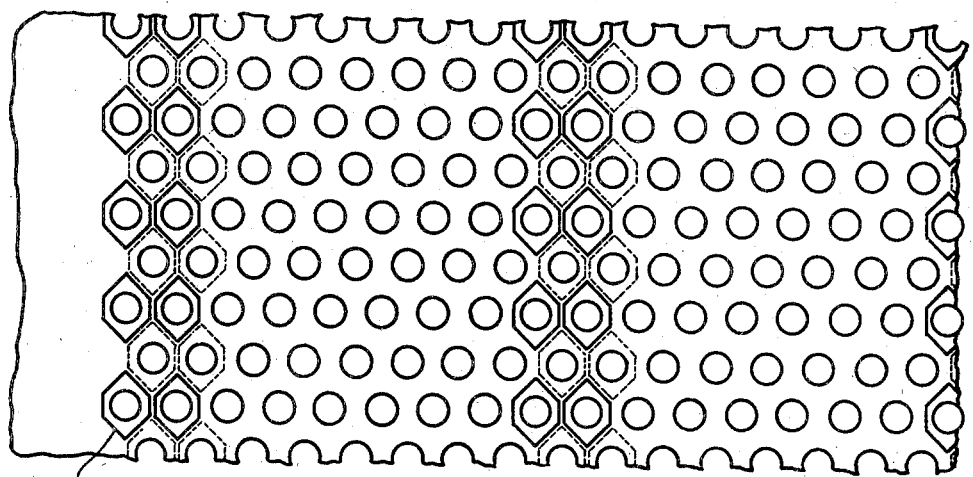
Inventor
Harry C Burden
Maréchal & Noe
Attorney Feb. 28, 1939. H. C. BURDEN 2,148,433
APPARATUS FOR COUNTERSINKING OPERATIONS AND THE LIKE
Original Filed July 11, 1932 6 Sheets-Sheet 6
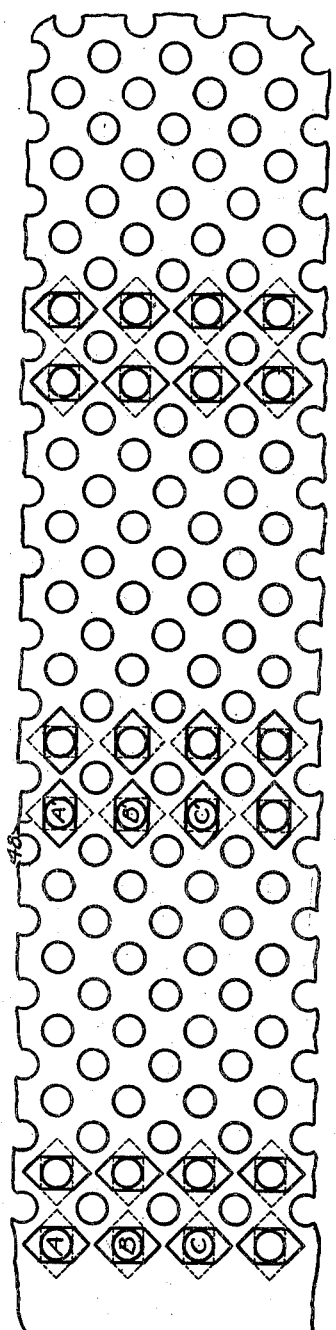
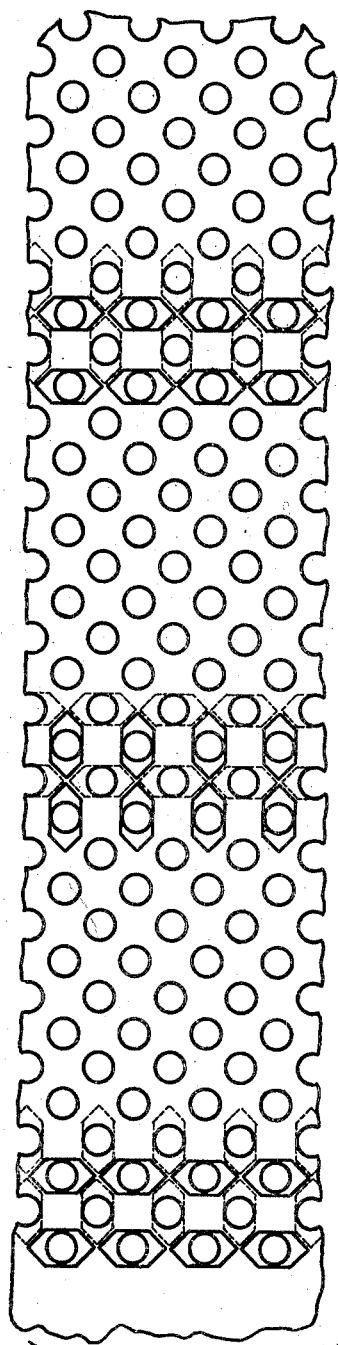
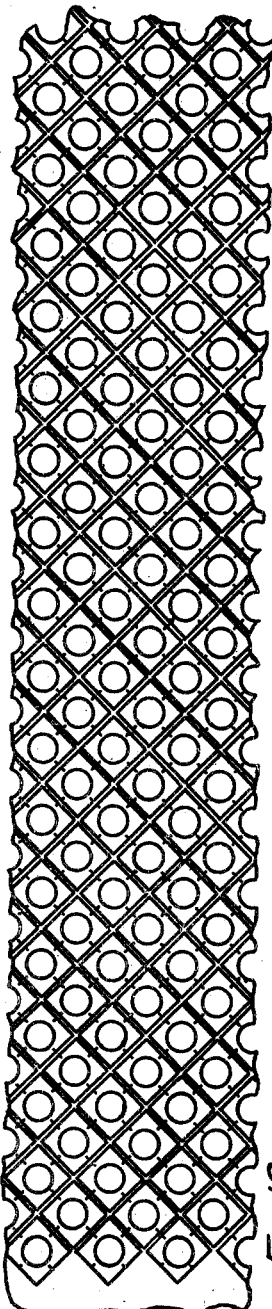

Patented Feb. 28, 1939

2,148,433

UNITED STATES PATENT OFFICE 2,148,433

APPARATUS FOR COUNTERSINKING OPERATIONS AND THE LIKE

Harry C. Burden, Sandusky, Ohio, assignor to Sandusky Foundry & Machine Co., a corporation of Ohio Original application July 11, 1932, Serial No. 621,765. Divided and this application January 16, 1936, Serial No. 59,443

8 Claims. (Cl. 90—14)

This invention relates to apparatus for performing countersinking operations and the like, the present application being a division of application, Serial No. 621,765, filed July 11, 1932, now Patent 2,053,261.

One object of the invention is the provision of a countersinking apparatus such as can be used for the countersinking of suction roll shells or for other purposes, and providing for milling of the work adjacent holes or perforations in the work to provide depressions having a perimeter or outline of polygonal form.

Another object of the invention is the provision of an apparatus for performing milling operations, and embodying a milling cutter having a body portion adapted for the rotatable support of a driving shank and of a milling cutter which is operable about an axis perpendicular to the axis of rotation of the driving shank.

Another object of the invention is the provision, in an apparatus of the character herein described, of a gang milling machine embodying a series of milling tools each having a body portion adapted for cooperative assembly with other body portions in a predetermined manner.

Other objects and advantages of the invention will be apparent from the following description, the appended claims and the accompanying drawings, in which—

Fig. 1 is a top plan view of a portion of a machine having a series of gang milling cutters embodying the present invention;

Fig. 2 is an end view of the same;

Fig. 3 is an end view of some of the gang milling cutters;

Fig. 4 is a corresponding side view of the milling cutters;

Fig. 5 is a sectional view of one of the milling cutters taken on the line 5—5 of Fig. 3;

Fig. 6 is an enlarged plan view of a fragment of a suction roll shell showing one preferred arrangement of the construction of this invention;

Figs. 7 and 8 are views of a portion of a gang of milling cutters of modified form;

Fig. 9 is a section on the line 9—9 of Fig. 7;

Figs. 10, 11 and 12 are enlarged plan views of a fragment of a suction roll shell showing various stages in its completion, each countersunk portion being made by two operations;

Fig. 13 is a view of a fragment of a suction roll shell showing a further modified arrangement;

Fig. 14 is a top plan view of a portion of the series of cutters, showing how they are slidably mounted in the machine; and Fig. 15 is a side elevation corresponding to Fig. 14.

Referring more particularly to the drawings by reference numerals, and first with more particular reference to Figs. 1 to 6 inclusive, the invention illustrated in these figures provides for the countersinking of the holes of a suction roll shell or the like, each countersunk portion being produced by means of a milling cutter which gouges out the surface of the shell adjacent each hole to provide depressions of polygonal outline. While the invention as herein set forth is illustrated in connection with a suction roll shell, it is obvious that surfaces of other structures may be countersunk in a similar manner.

The machine illustrated in Figs. 1 and 2 is of the general character disclosed in the patent to William H. Millspaugh, No. 1,854,053, granted April 12, 1932. The suction roll shell 10 is removably supported on the carrying shafts 11 and 12 which are movable axially in the bearings 13 and rotated some predetermined distance by means of an indexing lever 14 fixed to an operating gear 15 and having a suitable stop which holds the shell fixed in desired positions. Movement of the gear 15 is transmitted to the worm wheel 16 which is splined on the shaft 12, and as the shaft 12 is rotated it is also moved axially by the threads 17 cooperating with threads provided in a nut 18 adjustably secured to a portion of the frame, the details of the construction being more fully set forth in the prior patent referred to, and thus they will not need to be further explained. The shell is drilled preferably so that the holes will lie on successive convolutions, by successively drilling around the shell with a gang of uniformly spaced drills while successively relatively positioning the shell and the drills according to the course of the spiral. While the holes in the shell are preferably arranged in spirals as set forth in the patent referred to, it will be obvious that in accordance with the present invention they may if desired be arranged in circular or annular rows.

The supporting means for the drills, and the operating means by which the drills are caused to advance against and through the shell and then reverse and be withdrawn therefrom may be of any known or approved type. The drill sockets of the gang machine are also adapted to receive the shanks of a gang of milling cutters, one of which has been shown in Fig. 5. Thus the drills may be removed from the sockets and replaced by the shanks of the milling cutters after the drilling operation has been completed and when it is desired to mill out the countersunk portions adjacent each of the holes. As shown the cutters are preferably arranged at one side of the shell as represented in Figs. 1 and 2.

Each of the milling cutters comprises a shank 20 rotatably supported in a body member 21 by means of an antifriction bearing 22 and the annular bearing surface 23 provided between a shank extension and a bushing which is fixed in the body member 21. On the lower end of the shank extension is fixed a bevelled gear 24 which meshes with a bevel gear 25 carried on a shaft 26 extending perpendicularly to the shank 20. Meshing with the spur gear 27 on shaft 26 is a small gear 28 fixed on a stub shaft 29, the gear 28 meshing with the gear 30 on shaft 31. Carried by shaft 31 is a milling cutter 32 which is thus rotatably driven about an axis extending perpendicularly to the axis of rotation of the shank 20. The shafts 26, 29, and 31 are rotatably mounted in bearings provided in the body member, and in removable cup members 33. The arrangement is such that the milling cutter 32 will be rotated at a desired speed when the body member 21 is held stationary and the shank 20 is revolved.

The various body members 21, 21', 21'', etc., of the gang of milling cutters are arranged side by side one against the other and held with respect to any rotational movement on the cutter head supporting base 34. Removable cap plates 35 which overlap the adjacent side edges of the body members are bolted tightly to the tops of vertically extending posts or walls 37 which are provided, preferably integrally, on the fixed base casting 38 between the spindle positions. The cap plates 35 allow the milling tools to slide under them when in operation, and are readily removed so that one of the tools can be withdrawn without disturbing any of the others. The flat sides of the tool bodies bear against one another and there are blocks 39 which keep the end tools in place. The blocks 39 are bolted to the base casting 38 on which the tools are slidably supported.

The milling cutters 32 may be arranged at a suitable angle as shown in Fig. 3 with respect to the gang series so that they may cut the surface of the suction roll shell adjacent each of the perforations and thus gouge out or countersink a recess having a perimeter of polygonal form in a single cutting operation. The width of the cutters 32 corresponds to the total length of cut taken so that a square countersunk recess, as shown in Fig. 6, is cut into the outer surface of the shell adjacent each perforation, the size of the countersink being such as to leave a small uncut portion of the cylindrical surface of the shell between adjacent undercuts.

In drilling the holes in the shell the holes $a$, $b$, $c$, etc., are drilled successively by the drill which is positioned at the left-hand side of the shell as viewed in Fig. 1, while at the same time the next succeeding drill is cutting the holes $a1$, $b1$, and $c1$, the holes $a$, $b$ and $c$ being arranged in a spiral of very small pitch so that after a complete revolution of the shell the drill by which they are formed will be in position to cut the hole $d$, after which the hole $e$ will be cut, etc. The holes cut by the other drills are of course arranged in similar spirals. After several complete revolutions of the shell the spiral series of holes cut by one drill will join the series of holes cut by the next succeeding drill. The indexing mechanism of the machine is then reset so that the holes $g$, $h$ and $i$ will be drilled and then after several revolutions of the shell the entire operative surface of the shell will be perforated in a predetermined pattern. The drills are then removed from the holders, and replaced by the milling cutters, and the entire series of indexing and cutting operations of the machine is repeated but with the milling cutters in place, so that the holes $a$ and $a1$, etc., are countersunk by the milling cutters 21 and 21', etc., followed by countersinking operations of the holes $b$ and $b1$, etc. The amount of downward feeding movements of the gang cutters is limited by suitable stopping mechanism or by the lower side of the body members of the cutters so that the width of the square countersink is such as to leave uncut a comparatively narrow band 36 of square form around each hole, the squares shown in solid lines in Fig. 6 representing the perimeters of the countersunk depressions while the dotted squares show the perimeters of the depressions that will be countersunk in successive operations after the first spiral series has been completed. Each square countersunk recess, however, will be produced in one operation in accordance with the construction referred to. The uncut cylindrical surface is quite small in total area after the countersinking operation has been completed and collectively presents a net-like wire supporting surface lying between and filling the spaces between the countersunk outer ends of all the perforations, so that the countersunk area greatly increases the suction area of the roll without appreciably weakening the roll strength. In accordance with the present invention the countersinking of the holes of a suction roll shell or the like is quickly accomplished and without requiring the removal of the shell from the combined gang drilling and milling machine. As the holes are countersunk by a milling operation it will be apparent that the true cylindrical character of the outer surface will be maintained without deformation, and as the same indexing mechanism is used for the countersinking operation as is employed for the drilling operation, the countersunk recesses will be exactly coordinated with the centers of the holes and with one another.

Instead of arranging the milling cutters to produce the countersunk recesses in a single operation, the form of construction shown in Figs. 7 to 12 inclusive may be employed, so as to cut four sided or square indentations in two operations. Referring now to Figs. 7 to 12, the body members 40 of the milling cutters 41, 42, 43, etc., of the gang of cutters employed, and the driving connection between the milling cutters 46 and the spindles 47 correspond to the construction shown in Fig. 5. The milling cutter 46, however, instead of having straight cutting edges arranged cylindrically, have angularly related sides, the cutters being generally V-shaped and having a width substantially less than the total width of the finished countersunk recesses desired. The depth to which these cutters are moved into the body of the shell, however, is such as to provide cuts of the character shown in solid lines in Fig. 10, having a six-sided outline. As shown in Figs. 7 and 8 the cutters are so arranged that successive or adjacent milling cutters revolve about axes displaced 90° from one another. In this way the holes A, B and C will be partially countersunk by cutter 42 as the shell is indexed on the machine, while at the same time the holes A1, B1, and C1 in succession will be countersunk by the cutter 43. For purposes of example, Figs. 10, 11 and 12 show an arrangement of holes in which seven complete revolutions of the shell will bring the cutter 42 into engagement with the six-sided recess made by the cutter 43 so that the dotted line portion shown at 48 will then be cut by cutter 42 thus completing the square outline of the countersunk recess. The completion of the entire countersinking operation would follow after resetting the shell with respect to the cutters. The finished product is represented in Fig. 12, and like the construction in Fig. 6 it provides a small uncut cylindrical shell surface in the form of hollow squares centered with and around the holes.

Fig. 13 shows a further modification in which six-sided countersunk recesses may be provided adjacent the outer end of each of the holes in a single operation, using a gang of V-shaped milling cutters in which the cutting tools all revolve on parallel or aligned axes, such milling cutters being fed into the shell a sufficient distance to provide hexagonally formed recesses as shown at 50.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine of the character described, a gang of milling tools each comprising a driven shank, a body member and a milling cutter rotatable on an axis extending substantially transversely to the axis of rotation of the shank, said body members each having parallel opposed sides adapted for abutting engagement with adjacent body members, and guide means engaging said body members and maintaining said body members in predetermined relationship with respect to one another.

2. A machine for countersinking holes comprising a series of parallel driving shafts, a gang of milling tools each having a shank adapted for connection with one of said shafts and each having a milling cutter rotatable about an axis extending perpendicularly to the axis of the shank, each milling tool having a body portion in which its shank and milling cutter are rotatably supported and serving to partially house the milling cutter, the body portions of the milling tools being arranged in line one in contact with another whereby the several body portions are held stationary.

3. A machine for countersinking holes comprising a series of parallel driving shafts, a gang of milling tools each comprising a body portion having a shank adapted for connection with one of said shafts and having a milling cutter rotatable about an axis extending perpendicularly to the axis of the shank, the body portion of each milling tool serving to hold the body portion of an adjacent milling tool against rotation, and means for guiding said body portions in the direction of the shank axes.

4. A machine for countersinking holes comprising a series of parallel driving shafts, a gang of milling tools each having a shank adapted for connection with one of said shafts and each having a milling cutter rotatable about an axis extending perpendicularly to the axis of the shank and located centrally in line with the shank axis, each milling tool having a body portion in which its shank and milling cutter are rotatable supported, the body portions of the milling tools being arranged in line.

5. A machine for countersinking holes comprising a gang of milling cutters arranged in line, each cutter having a body member and having a rotatable shank adapted to be driven by the machine, a milling cutter rotatable about an axis extending perpendicularly to the axis of rotation of said shank for each of said body members, the body member of each milling cutter having opposed positioning surfaces extending generally transversely of the line of cutters and adapted for contact with the similar body members of adjacent milling cutters so that each body member is held against rotation by adjacent body members.

6. In a machine of the character described, a number of body members arranged in a series one alongside of another, each body member having opposed surfaces extending transversely of the series and cooperating with adjacent body members to restrain rotational movements thereof, each of said body members having an operating shank rotatably mounted therein and having a cutting means operated by said shank, and a common supporting means for said body members.

7. In a machine of the character described, a number of body members arranged in a series one along side of another, each body member having opposed surfaces extending transversely of the series and cooperating with adjacent body members to restrain rotational movements thereof, each of said body members having an operating shank rotatably mounted therein and having a cutting means operated by said shank, and a common means for guiding said body members for movement in the direction of the axes of said shanks.

8. In a machine of the character described, a number of body members arranged in a series one along side of another, each body member having opposed surfaces extending transversely of the series and cooperating with adjacent body members to restrain rotational movements thereof, each of said body members having an operating shank rotatably mounted therein and having a milling cutter rotatably supported in the body member on an axis extending perpendicularly to the axis of the shank and operably connected to said shank, and a common supporting means slidably guiding said body members for movement in the direction of the axes of said shanks.

HARRY C. BURDEN.